US011204106B1

(12) United States Patent
Doyle et al.

(10) Patent No.: US 11,204,106 B1
(45) Date of Patent: Dec. 21, 2021

(54) VALVE ASSEMBLY

(71) Applicant: Valve Technologies, LLC, Pompano Beach, FL (US)

(72) Inventors: Kevin Doyle, Pompano Beach, FL (US); William Weiss, Parkland, FL (US)

(73) Assignee: Valve Technologies, LLC, Pompano Beach, FL (US)

( * ) Notice: Subject to any disclaimer, the term of this patent is extended or adjusted under 35 U.S.C. 154(b) by 0 days.

(21) Appl. No.: 17/185,926

(22) Filed: Feb. 25, 2021

(51) Int. Cl.
| | |
|---|---|
| F16K 31/04 | (2006.01) |
| F16K 37/00 | (2006.01) |
| G01F 1/115 | (2006.01) |
| G01F 15/00 | (2006.01) |
| G05D 7/06 | (2006.01) |
| G05D 16/20 | (2006.01) |

(52) U.S. Cl.
CPC ............ *F16K 37/005* (2013.01); *G01F 1/115* (2013.01); *G01F 15/005* (2013.01); *G05D 7/0635* (2013.01); *G05D 16/20* (2013.01)

(58) Field of Classification Search
CPC ...... F16K 37/005; G01F 1/115; G01F 15/005; G05D 16/20; G05D 7/0635
USPC ......... 137/455, 486, 487.5; 251/129.11, 217, 251/366, 264
See application file for complete search history.

(56) References Cited

U.S. PATENT DOCUMENTS

| | | | | |
|---|---|---|---|---|
| 4,404,861 A | * | 9/1983 | Wass | ........................ G01F 1/12 73/861.83 |
| 4,789,132 A | * | 12/1988 | Fujita | ........................ F16K 1/12 251/129.11 |
| 4,838,483 A | | 6/1989 | Nurczyk | |
| 4,948,091 A | * | 8/1990 | Satoh | ........................ F16K 1/12 251/129.11 |
| 5,979,493 A | * | 11/1999 | Simpkins, Jr. | .......... F16K 17/20 137/487.5 |
| 6,227,223 B1 | | 5/2001 | Crochet | |
| 6,230,558 B1 | * | 5/2001 | Miwa | ..................... B60K 15/04 73/114.39 |
| 6,487,919 B1 | * | 12/2002 | Edwards | ................. G01F 1/115 73/861.77 |
| 6,913,203 B2 | | 7/2005 | Delangis | |

(Continued)

FOREIGN PATENT DOCUMENTS

| | | |
|---|---|---|
| CN | 104879534 A | 9/2015 |
| CN | 106641422 A | 5/2017 |

(Continued)

OTHER PUBLICATIONS

International Search Report for PCT/US2021/048117 dated Sep. 20, 2021.

*Primary Examiner* — Minh Q Le
(74) *Attorney, Agent, or Firm* — Clayton, McKay & Bailey, PC

(57) ABSTRACT

A valve assembly includes a first housing that defines an inlet and a fluid output chamber. A second housing is engaged to the first housing and a cover is engaged to the second housing. A valve member is positioned within the first housing. An actuator is positioned between the second housing and the cover and is attached to the valve member through an engagement located within the first housing. A flow rate sensor, as a component of the valve assembly, may be positioned downstream of the inlet and the fluid output chamber.

19 Claims, 7 Drawing Sheets

(56) References Cited

U.S. PATENT DOCUMENTS

| | | | |
|---|---|---|---|
| 7,942,071 B2 * | 5/2011 | Claisse | G01F 1/10 73/861.79 |
| 8,606,413 B2 * | 12/2013 | Picton | E03B 7/071 700/282 |
| 8,833,405 B2 | 9/2014 | Phallen | |
| 9,241,604 B2 | 1/2016 | Dries | |
| 9,470,336 B2 | 10/2016 | Huffington | |
| 9,695,954 B2 | 7/2017 | Da Pont | |
| 9,857,805 B2 * | 1/2018 | Halimi | G05D 7/0635 |
| 10,261,523 B2 | 4/2019 | Khabbaz | |
| 10,508,423 B2 | 12/2019 | Herbert | |
| 10,508,753 B2 | 12/2019 | Ravedati | |
| 10,514,172 B2 | 12/2019 | Acker | |
| 2002/0029804 A1 * | 3/2002 | Liorati | F16K 31/0655 137/486 |
| 2004/0215778 A1 | 10/2004 | Hesse | |
| 2005/0081642 A1 * | 4/2005 | Nehl | G01F 1/115 73/861.79 |
| 2005/0119766 A1 | 6/2005 | Amundson | |
| 2010/0300213 A1 * | 12/2010 | Fink | G01F 1/115 73/861.79 |
| 2011/0130976 A1 * | 6/2011 | Lamberti | G01F 25/003 702/45 |
| 2011/0265883 A1 | 11/2011 | Cruse | |
| 2014/0165719 A1 * | 6/2014 | Williamson | G01F 1/06 73/272 R |
| 2015/0315803 A1 * | 11/2015 | Hamza | G01F 15/185 4/509 |
| 2015/0319941 A1 | 11/2015 | Klein | |
| 2017/0070842 A1 | 3/2017 | Kulp | |
| 2017/0211711 A1 | 7/2017 | Ritter | |
| 2018/0087938 A1 * | 3/2018 | Neilson | G01F 1/115 |
| 2018/0113481 A1 | 4/2018 | Faiczak | |
| 2018/0143052 A1 | 5/2018 | Xie | |
| 2018/0364654 A1 | 12/2018 | Locke | |
| 2019/0024943 A1 * | 1/2019 | Scott | F24H 1/185 |
| 2019/0286172 A1 | 9/2019 | O'Dell | |
| 2019/0368620 A1 * | 12/2019 | Masen | F16K 5/0407 |
| 2020/0070796 A1 | 3/2020 | Braatz | |
| 2020/0201365 A1 | 6/2020 | Shimizu | |
| 2021/0011500 A1 * | 1/2021 | Halimi | F16K 31/042 |

FOREIGN PATENT DOCUMENTS

| | | |
|---|---|---|
| DE | 102014006511 A1 | 11/2015 |
| EP | 23062306257 A1 | 4/2011 |

\* cited by examiner

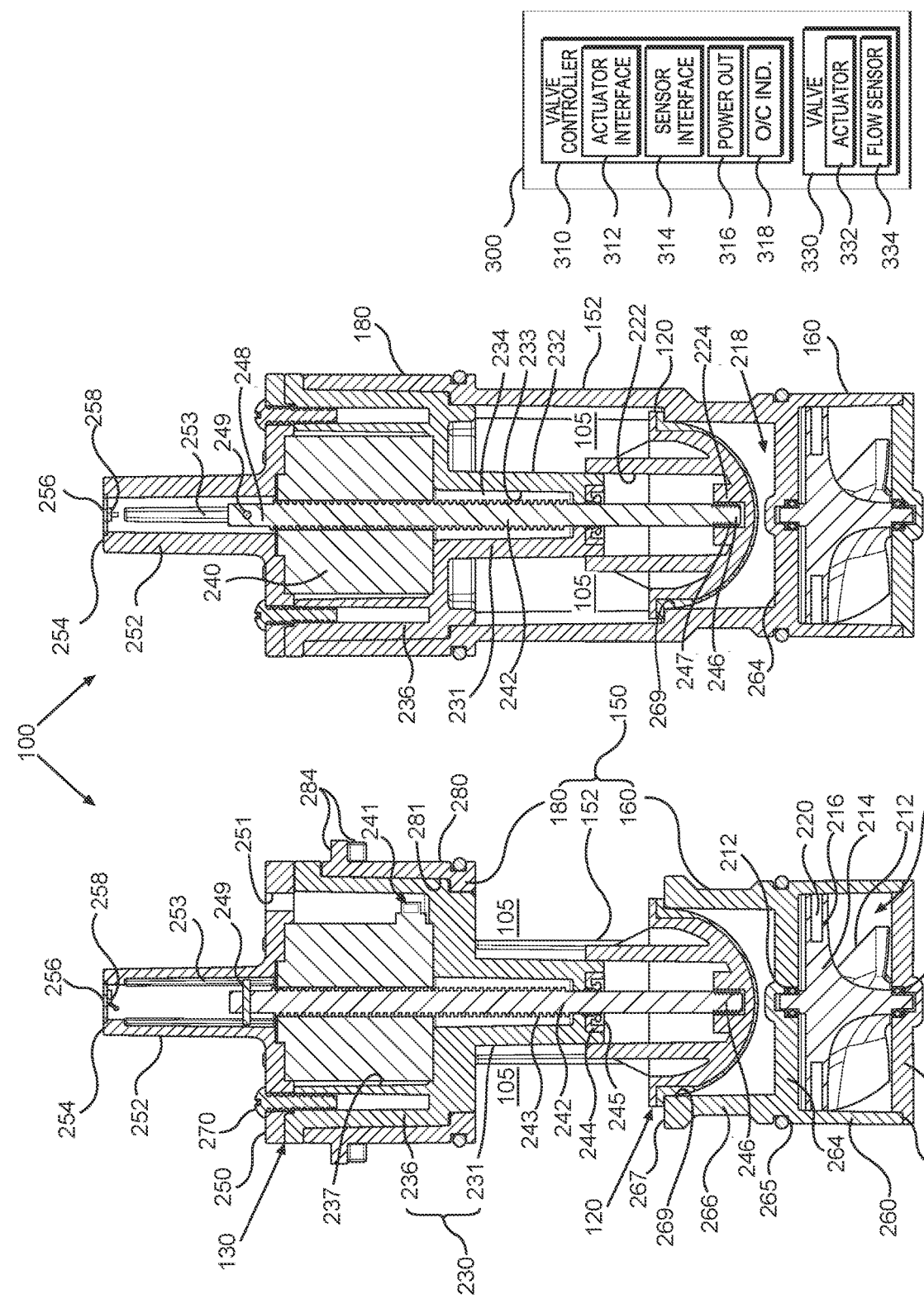

VALVE ASSEMBLY

BACKGROUND

Fluid distribution systems, such as those employed to manage pool operations, can include one or more fluid handling devices—pumps (e.g., single speed, multi-step, variable speed, etc.), filters, valves, various plumbing components, cleaning systems, heaters, water features (e.g., fountains, sprays, waterfalls, etc.), and/or other types. In these fluid distribution systems, multiple valves may be used to direct flow from, to, and within the various fluid handling devices. However, incorporation of such valves can present multiple challenges to highly responsive and precise operation of fluid distribution systems due to operational limitations of the valves and the complexities of coordinated control of large numbers thereof.

Many fluid distribution systems require multiple valves and actuators to divert fluid flow to and from fluid handling devices, as well as different circuits, of those systems. To accomplish these functions, example valves can be manually actuated, provided with automatic actuators (e.g., electric motors), capable of being actuated to operate in multiple positions, or have a combination of these operational features. However, current valve actuators are limited in their respective abilities to precisely set flowrates due to the small ranges of available settings provided by their respective designs. In the case of a fluid distribution system for a pool, for example, an installer is very limited in how valves can be setup so predefined flowrates required by each of fluid handling devices in the fluid distribution system are supplied.

Some valves may include one or two flow paths, and can be set to one of two positions by an automation system, for example. The added flow path and/or flow rate-controlling positions these valves provide can help to simplify overall system complexity. However, fluid distribution systems including many and multiple of the previously mentioned fluid handling devices will still require a dramatically increased number of these valves relative to simpler systems. Greater numbers of valves and actuators increase overall system cost and complexity. Furthermore, larger numbers of valves increase installation costs for labor and materials because more time is required for installation due to system complexity, and more plumbing components (e.g., piping, unions, fittings, etc.) are required for actual valve installs. Larger physical space is required for all the valves, actuators, and plumbing components used to operate such fluid distribution systems.

In addition, any of these components, depending on configuration and location within a run of piping/conduit to a valve, could cause head loss (pressure) within the run and thus losses in flow rate. Furthermore, these losses in flow rate may be generally unaccounted for in the overall operation of a fluid system including the valve and plumbing components mentioned above.

Along with increased costs and space requirements needed to provide and install fluid distribution systems having increased numbers of fluid handling devices, normal continuous operation and maintenance can require complex multi-component control systems. In some examples, each fluid handling device may require its own valve piped into a fluid circuit serving the component. In other examples, two components may share a valve connected to the fluid circuits that serve the two components. Each valve employed may include its own controller that has to be independently operated to provide a specific flow rate of fluid to the fluid handling device it serves. Controlling each valve in these fluid distribution systems requires accurate readings for a flow of fluid to, and more importantly a flow rate from, each valve.

As a result, a need exists for valve assemblies that conserve space by including components that perform operations from which flow rates can be indicated or otherwise derived. Further, a need exists for a valve assembly that is capable of rapidly operating on continuous basis to change a flow rate therethrough to a very precise degree, in response to changes to a flow path (e.g., temporary obstructions, pressure losses due to other valve operations, etc.) to or from the valve assembly. A need also exists for valve assemblies that can be easily dissembled into separate sub-assemblies that perform distinct functions such as regulating flow versus monitoring flow. Still further, a need exists for valve assemblies that include removable sub-assemblies can be easily serviced or replaced without requiring repair or replacement of other the sub-assemblies.

SUMMARY

Examples described herein include systems and methods for a valve assembly that may include a first housing, a second housing engaged to the first housing, and a cover engaged to the second housing. In one example, the first housing defines an open chamber, an inlet, and a fluid output chamber. A valve member may be positioned in the first housing, and an actuator may be positioned between the second housing and the cover. In one example, the actuator may be attached to the valve member through an engagement located within the first housing. In another example, the valve assembly may include a flow rate sensor positioned within the first housing downstream of the open chamber and the inlet.

In another example, a valve assembly may include a first housing, a second housing engaged to the first housing, and a cover engaged to the second housing. A valve member positioned in the first housing, and a prime mover may extend within the first housing to be attached to the valve member. In another example, an actuator may be positioned between the second housing and the cover. The actuator may be engaged with the prime mover and configured to cause a liner movement of the valve member towards and away from the inlet. In addition, a flow rate sensor positioned within the first housing downstream of the fluid output chamber. In one example, the flow rate sensor may include a flow monitoring component configured to perform an operation indicative of flow rate of fluid flowing from the fluid output chamber.

In other examples, a method of regulating a flow of fluid with a valve assembly may include operating an actuator to displace a valve member away from an inlet defined by a first housing of the valve assembly. Movement of a flow monitoring component caused to move by fluid flowing from the inlet and out of an end of the first housing may be registered. The method may include determining a flow rate of the fluid based on the movement of the flow monitoring component, and operating the actuator to move the valve member relative to the inlet with the actuator based on the determined flow rate. In one example, the flow monitoring component may move within an area within the first housing that is immediately adjacent to a fluid output chamber. This area may be defined by a body of the first housing downstream of the inlet and upstream of the end of the first housing.

Some examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 2A is a sectional view of the valve assembly of FIG. 1 taken from a plane indicated by line 2A-2A.

FIG. 2B is a sectional view of the valve assembly of FIG. 1 taken from a plane indicated by line 2B-2B.

FIG. 3 illustrates a schematic representation of a valve assembly including a valve controller, according to as aspect of the present disclosure.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
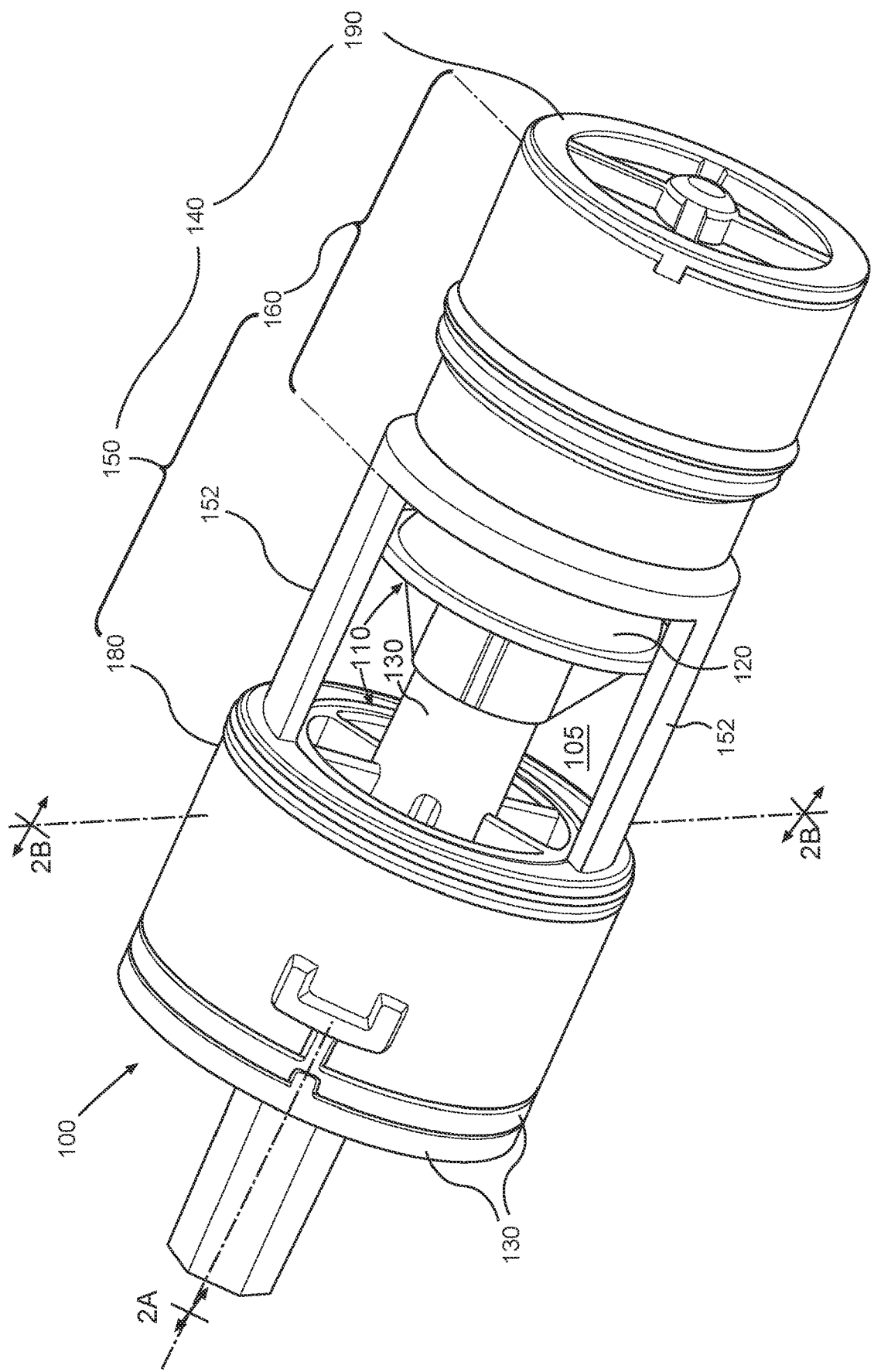
FIG. 1 illustrates a perspective view of a valve assembly, according to an aspect of the present disclosure.

FIG. 1 illustrates a perspective view of a valve assembly 100, according to an aspect of the present disclosure. The valve assembly 100 includes a first housing 150 and a first sub-assembly 110 that includes a valve member 120 attached to an actuator assembly 130. The first housing 150 includes a first mating structure 160, a pair of wall segments 152, and a second mating structure 180. As shown, the first and second mating structures 160, 180 extend from opposite ends of the pair of wall segments 152. The first housing 150 may be part of a second sub-assembly 140 of the valve assembly 100. The second sub-assembly 140 may also include a flow sensor (see FIG. 2) installed, or otherwise integrated into, the first mating structure 160, and a hub 190 engaged to an end face first housing 150 that is defined by the first mating structure 160.

During operation, the valve member 150 may be moved within an open chamber 105 defined by the wall segments 152 toward or away from a valve seat defined by a second end face of the first mating structure 160 of the first housing 150. Movement away from this valve seat will allow or increase fluid communication between the open chamber 105 and a fluid passage defined by the first mating structure 160. In one example, the flow sensor may include one of two flow sensing components (not shown) which operate in tandem to generate a signal representative of a flow rate of fluid as it flows through the first mating structure 160.

In the exemplary valve assembly 100 illustrated in FIG. 1, the valve member 150 is configured to move within the open chamber 105 defined by the wall segments 152. Furthermore, fluid may flow through gaps between the wall segments 152 and into an area immediately surrounding the actuator assembly 130 and the valve member 150. The valve assembly 100 of FIG. 1 includes two wall segments 152 but may include more wall segments having the same or different angular widths in other examples.

In still other examples of valve assemblies according to the present disclosure, one or both of the gaps may be defined by opposing edges of the wall segments 152 that include connection features, can be connected to one or more types of fittings, or are otherwise configured to receive a pipe or tube. In some of these examples, only one gap of a size and shape as the gaps illustrated in FIG. 1 may be defined by a single wall segment. Thus, the single wall segment may be provided in the form of a cylindrical wall that includes a cut-out portion defining an angular gap that extends over some length along a longitudinal axis of the valve assembly 100 between first and second mating structures 160, 180. Furthermore, edges of the single wall segment that define the gap may include connection features, be able to be connected to one or more types of fittings, or otherwise be configured to receive a pipe or tube. Accordingly, fluid entering a chamber defined by such a single wall segment will not flow through an area surrounding a valve member but be held within the chamber—unless a valve member has been operated to open an opening of the first mating structure 160 that is regulated by a position of the valve member 120.

FIGS. 2A and 2B provide sectional views of the valve assembly of FIG. 1 taken from planes indicated by lines 2A and 2B-2B.

The first mating structure 160 includes a first end 260 that may be sized so as to fit within an outlet of some type. The first end 260 of the first mating structure 160 may define a first end face 261 that may engage an end hub 190 of the valve assembly 100 that secures an impeller 210 within the first end 260. The first end 260 and first end face 261 may be sized to directly or indirectly engage, rest on, or otherwise be prevented from moving beyond a ridge formed on an inner surface of an outlet of, for example, a single valve or multi-valve manifold. The valve assembly 100 is configured such that a chamber surrounding the wall segments 152, and thus the open chamber 105, provides a supply of fluid for which the valve assembly 100 regulates continued flow thereof through the first end 260.

An impeller 210 is positioned within the first end 260 of the first mating structure 160 and carries one or more magnets 220 within individual blades 212 of the impeller 210. Each blade 212 includes a base portion 214, and at least two or more base portions may be formed with bores 216 configured to receive magnets 220. In one example, the magnets 220 are positioned within base portions 212 that are diametrically opposed relative to a longitudinal axis of the impeller 210.

In another example, a water wheel may be positioned within the first end 260 instead of an impeller. In this example, vanes of the water wheel may rotate about an axis of rotation that is perpendicular to a direction of flow through the first end (i.e., perpendicular to an axis of rotation of the impeller 210). Magnets may be provided within distal ends of one or more of the vanes. In one example, at least two diametrically opposed vanes (i.e., 180° apart) may include magnets.

As fluid flows through the first end 260 of the valve assembly 100, the impeller 210 is caused to rotate at a speed that may be proportional to a flow rate of the fluid flow through the first mating structure 160. The magnets 220 provide a flow monitoring component configured to be paired with a corresponding flow monitoring component, such as a Hall effect device. Rotation of the impeller 210 may be detected by the corresponding flow monitoring component as it registers the rotational movement of the magnets 220. Accordingly, the rate at which the component registers these signals can be used to determine revolutions per minute (RPM) of the impeller 210, which can then be converted to a flow rate. Rotation of the impeller 210 may be aided by first bearings 262 installed in the partition hub 264 and the end hub 190.

In one example, the corresponding flow monitoring component may be provided in a housing that is attached, directly or indirectly, to the first end 260. For example, the corresponding flow monitoring component may be attached to a bus that is configured to transmit signals generated by the movement of the magnets 220. In another example, the corresponding flow monitoring component may be embedded in a wall of the first end 260, a partition hub 264, or the end hub 190. In any of these examples, the corresponding flow monitoring device may be connected to a terminal or other type of contact that is accessible from an outer surface of the first end 260 for electrical connection thereto.

In other examples, the valve assembly 100 may be equipped, either in addition to or as a substitute for the flow monitoring components described above, with other types of flow monitoring components. In one example, the valve assembly 100 may be equipped with an ultrasonic flow sensor downstream of the inlet 269 and the fluid output chamber 218. Such an ultrasonic flow sensor may be installed within the first mating structure 160 or attached to the first end 260.

The signals may be transmitted to a valve controller 310, discussed in more detail with reference to FIG. 3, or a fluid distribution control system that controls the operation of the valve assembly. The valve controller 310 or the fluid distribution control system can process the pulses generated by the rotation of the impeller 210 and derive an actual flow rate and thereby generate a GPM value.

A second end 266 of the first mating structure 160 is separated from the first end 260 by the partition hub 264 as shown in FIGS. 2A and 2B. An outer circumference of the first mating structure 160 may be formed with a recessed groove 265 as shown in FIGS. 2A and 2B, and used to receive an O-ring that helps secure the first housing 150 to, for example, an outlet of a manifold or other type of fluid handling device. In another example, instead of, or in addition to the O-ring, the first end 260 of the first mating structure 160 can be sized to be press-fit to an inner surface of such an outlet.

Above the partition hub 264 and the recessed groove 265, the second end 266 of the first mating structure 160 defines a bore or other shaped area that may receive a valve member 120 of the valve assembly 100. The second end 266 of the first mating structure 160 defines a second end face 267 configured to provide a valve seat (hereafter "second end face 267" or "valve seat 267") for engaging the valve member 120 (e.g., a plunger) of the valve assembly 100. An inner edge of the valve seat 267 defines an inlet 269 for a fluid output chamber 268 of the valve assembly 100. When the inlet 269 surrounded by valve seat 267 is at least partially unobstructed by the valve member 120, fluid may flow into a flow chamber 268 defined by an inner surface of the second end 266, through passages (see FIGS. 7A to 8B) in the partition hub 264, past the impeller 210, and out of passages formed in the end hub 190. In one example, fluid passing through the bore defined by the first end 260 which accommodates the impeller 210, causes the impeller 210 to rotate at a speed that is proportional to, or otherwise indicative of, a flow rate of the fluid as it passes through the bore and out the end hub 190.

During a valve closing operation, an actuator 240 of the valve assembly may be operated to bring a surface of the valve member 120 into abutment with the second end face 267 to provide a tight seal of the inlet 269. As a result of this operation, fluid flowing into an area surrounding the open chamber 105 will not enter the second end 266 through the inlet 269, and therefore will not go through the fluid output chamber 268 or the partition hub 264, or past the impeller 210, or out of the end hub 264.

Turning to the second mating structure 180 of the first housing 150, this portion of the valve assembly 100 is configured to slide in and be locked to a slot of, for example, a valve retention plate. An outer surface 280 of the second mating structure 180 may be provided with engagement members 284 to facilitate an interlocking engagement. An inner surface 281 of the second mating structure 180, on the other hand, may be specifically configured to receive and secure a second housing 230 of the first sub-assembly 110 that includes the actuator assembly 130 and the valve member 120 of the valve assembly 100.

The first sub-assembly includes the second housing 230 which includes a base 236 and a stem portion 231. The base 236 includes bores that may be used with fasteners 239 to attach to the second housing 230 to the valve cover 250. In addition, the base 236 is configured to receive an actuator 240 and a shaft 242 operatively coupled to the actuator assembly 130. The stem portion 231 includes an inner wall 233 that defines a passage 234 to accommodate movement of the shaft 242 below the actuator assembly 130. A lower end of the stem portion 21, the inner wall 233 includes a section having a diameter that substantially corresponds to an outer diameter of an unthreaded portion of the shaft 242. Adjacent to that section of the inner wall, a slide bushing 244 and shaft seal 245 may be provided within the lower end of the stem portion 231 as illustrated in FIGS. 2A and 2B. In other examples, the second housing 230 may also additionally include a bearing in this area of the stem portion to assist the rotational and linear movement of the shaft 242.

An outer wall 232 of the stem portion 231 slidingly engages an inner wall 222 of the valve member 120. The inner wall 222 of the valve member 120 defines a bore that receives a distal end 246 of the shaft 242 above a fixing engagement between the shaft 242 and the valve member 120.

The shaft 242 may include a first threaded section 243 engaged to the actuator assembly 130, and a second threaded section 247 formed on a surface of the distal end 246. In one example, the actuator 240 may include a stepper motor having a stator and a rotor. Through an engagement between the first threaded section 243 and a corresponding threaded surface provided by a rotor, the shaft 242 may be caused to move in a linear manner with rotation of the rotor. On the other hand, the second threaded section 243 may be utilized to securely attach the shaft 242 to a threaded bore 224 provided in the valve member 120.

Upward movement of the shaft 242 will likewise cause an upward movement of the valve member 120 away from the valve seat 267 defined by the first mating structure 160. The valve member 120 may be shaped so that moving away from the valve seat 267 gradually lessens by how much a fluid port defined by the second end 266 is obstructed by a body of the valve member 120. A flow rate of fluid entering the second end 266 of the first mating structure 160, and thus exiting through the first end 260, increases or decreases in proportion to a degree to which the valve member 120 obstructs an opening to a fluid output chamber 218 defined by the second end 266.

In the exemplary case shown, with the actuator 240 provided by a stepper motor, the actuator assembly 130 can controllably move the shaft 242, and thus the valve member 120, in extremely small and precise increments. In one example, the valve controller 241 may count the steps provided to the stepper motor and store the count in memory to thereby know a precise position of the shaft 242 and thus the valve member 120. In another examples, an external controller in communication with the actuator 240, either directly or via the valve controller 241, may count the steps provided to the stepper motor. In any of the above mentioned configurations, a degree to which the second end 266 is obstructed by the valve member 120, and flow rate of fluid through the first end 260 can be controlled to a very precise degree by a fluid distribution control system and/or the valve controller 241. An example of a valve controller is described with reference to FIG. 3, and includes features that may be employed in the valve controller 241 of FIG. 2A.

Linear movement of the shaft 242 may be guided by an engagement between a pin 249 for the shaft 242, and guide tracks 253 formed in an inner wall of a head 252 of the valve cover 250. The pin 249 may extend from both ends of a bore formed in a proximal end 248 of the shaft 242, at a right angle relative to a longitudinal axis of the shaft 242/first sub-assembly 110. A cap 256 mounted on a top end 254 of the head 252 may be fitted with a position sensor 258 for determining a position of the proximal end 248 of the shaft 242. In one example, the position sensor 258 includes a switch that is closed by contact with the proximal end 248 to signal to the valve controller 241 or a fluid distribution control system, that the valve assembly 100 is in a fully open position.

More specifically, closing of a switch, if provided as the position sensor 258, conveys that the shaft 242 has been displaced a maximum distance in one direction that the shaft 242 is capable of being displaced. As will be explained in more detail with reference to FIG. 3, a valve controller can use this feature to check whether a position of the shaft 242, and thus an opening degree of a port regulated by the valve member 120, is being tracked correctly. In another example, the position sensor may include any type of position sensing device such as a hall sensor, an optical encoder, a diaphragm, a fluid displacement sensor, capacitive position sensor, and the like. In yet another example, a position sensor may be installed at the bottom of the stem portion 231 of the second housing 230 and used to track a feature on a surface of the shaft 242 such as, or just below, a bottom thread of the first threaded section 243. In any of the examples described herein, a position sensor may be utilized to determine a position of the valve member 120 and a degree to which the valve member 120 must be moved in a valve closing or opening direction to obtain a desired flow rate.

In the example shown, the stepper motor/actuator assembly 130 and threaded shaft/prime mover 242 configuration provides for movement of the shaft 242 that can be controlled over small increments of displacement with a high degree of precision. Thus, as previously mentioned, a degree by which the second end 266 is obstructed by the valve member 120, and flow rate of fluid through the first end 260, can be controlled to a very precise degree by a valve controller integrated, or otherwise installed with the actuator. Such a valve controller is represented as component 241 of the actuator 240 in FIG. 2A. It will be understood by those having ordinary skilling in the art, such a valve controller component 241 may be embodied by processor of a computing device, or more generally by a computing device. Such a computing device may include a processor, memory, and storage comprising a non-transitory computer readable medium for storing instructions that, when executed by the processor, cause the valve assembly 100 to regulate a flow of fluid to and through the chamber 268 and end hub 190 in accordance with said instructions. An example of such a valve controller is illustrated schematically in FIG. 3.

FIG. 3 illustrates a schematic representation of a valve assembly 300 including a valve controller 310, according to as aspect of the present disclosure.

The valve controller 310 can include an actuator interface 312 for communicating and/or directing operations of an actuator 332, a sensor interface 314 for processing flow information from a flow sensor 334, a power output 316, and a valve full-open or full close indicator 318 (identified as "O/C IND." in FIG. 3; hereafter referred to as "O/C indicator 318").

Each actuator interface 312 can provide a line of communication between a respective actuator 332 and control manager (not shown) for a respective valve controller 310. In one example, the actuator interface 312 can perform one or more processes to determine an instruction which it transmits to a respective actuator 332 and causes the actuator 332 to perform the operation specified in the instruction. In another example, an instruction can be generated at a level of a processor for a fluid distribution control system, and the actuator interface 312 can serve as a communication channel between that control system and the respective actuator 332. In other examples, the actuator 332 may be directly controlled by a dedicated actuator interface 312 to reduce a processing burden on a fluid distribution control system that operates multiple valves or other fluid handling devices.

In one example, stepper motors may be provided for the actuators 332 as in the example of FIGS. 2A and 2B, actuator interfaces 312 may include integrated stepper motor controllers (e.g., a DRV8254, or the like) configured to issue enable, step, and direction signals to one or more stepper motors. In this example, the stepper motor controllers may be equipped with special hardware and have special hardware requirements for setup such that some operations may be hardwired on a printed circuit board ("PCB"). Such a PCB may be incorporated in the valve controller 310.

A sensor interface 314, in one example, can process information from a respective flow sensor 334 (e.g., a signal, a series of signals, a message, flag status, value of a measured parameter) for: display; translation and display; additional processing, translation, and display; or verification and display. In one example, the sensor interface 314 may provide a communication path between a respective flow sensor 334 and a processor of the valve controller 310 or a fluid distribution control system. This processor may determine a flow rate from the information provided by the actuator interface 312, which is based on the information received from the respective flow sensor 334.

In another example, the sensor interface 314 may primarily, or additionally, provide a second flow monitoring component that is paired with a first flow monitoring component, such as the magnets 220 of the impeller 210, installed at the first end 260 of the first mating structure 160 of the valve assembly 100 of FIGS. 1, 2A, and 2B. Accordingly, the sensor interface 314 may include a Hall effect device communicatively connected to a flow measuring device in the form of the magnets provided within the first end 260. In addition, the sensor interface 314 may include hardware that interfaces these Hall effect devices to a respective valve controller 310. These magnets 220, as the flow measuring device, may encompass primarily, or in part, a flow sensor 334. In this example, the flow sensor 334 may generate two pulses per rotation of the impeller 210 and thereby provide data that can be used to determine and indicate a flow rate of fluid passing through the first end 260 of the valve assembly 100.

A power output 316 for the valve controller 310 may be configured to connect a power input to supply power to the valve assembly 690 and its actuator 332 and flow sensor 334. The power output 316 can draw from a connection to a power supply, such as a 24 VAC power supply. Hardware incorporated in the valve controller 310 and represented by the power output 316 components, may carry a 5V or 3.3V signal and manage power requirements for the valve controller 310, the actuator interface 312, and the actuator 332.

The valve assembly 300 can be one of several devices, including other valve assemblies, that is powered through a connection to a single power input connected to an external power source.

As noted above, the valve controller 310 includes a full-open/full-close indicator that may be configured to detect or otherwise operate as a way of indicating that an actuator 332 (or valve member) is located in a home position and the respective valve 300 is in a fully open or fully closed state. For example, each valve controller 310 may include a home momentary contact switch that can be used to define a fully open position for the valve assembly 300, and can be considered as a limit switch for an open flow channel.

During an initial setup, an actuator 332 may operate a valve assembly 300 to open a respective fluid flow channel until a respective O/C indicator 318 registers a position of a valve member and, in this example, an open state of a flow channel. In a particular example where a stepper motor is provided as an actuator 332, a stepper motor control may open a respective flow channel until a home switch provided as an O/C indicator 318 closes, and thereby indicates a maximum open travel of a valve member has been hit. This method of open (or closed) detection can be utilized to provide a valve assembly is in a fully open state during setup, and during normal manifold operations as a diagnostic device to indicate a possible error in a position of a valve member.

As described herein, a home position may correspond to a position of an actuator and valve member that corresponds to a fully open or a fully closed state of a valve assembly. In one example, each O/C indicator 318 may be monitored by a respective valve controller 310.

Figure 4:
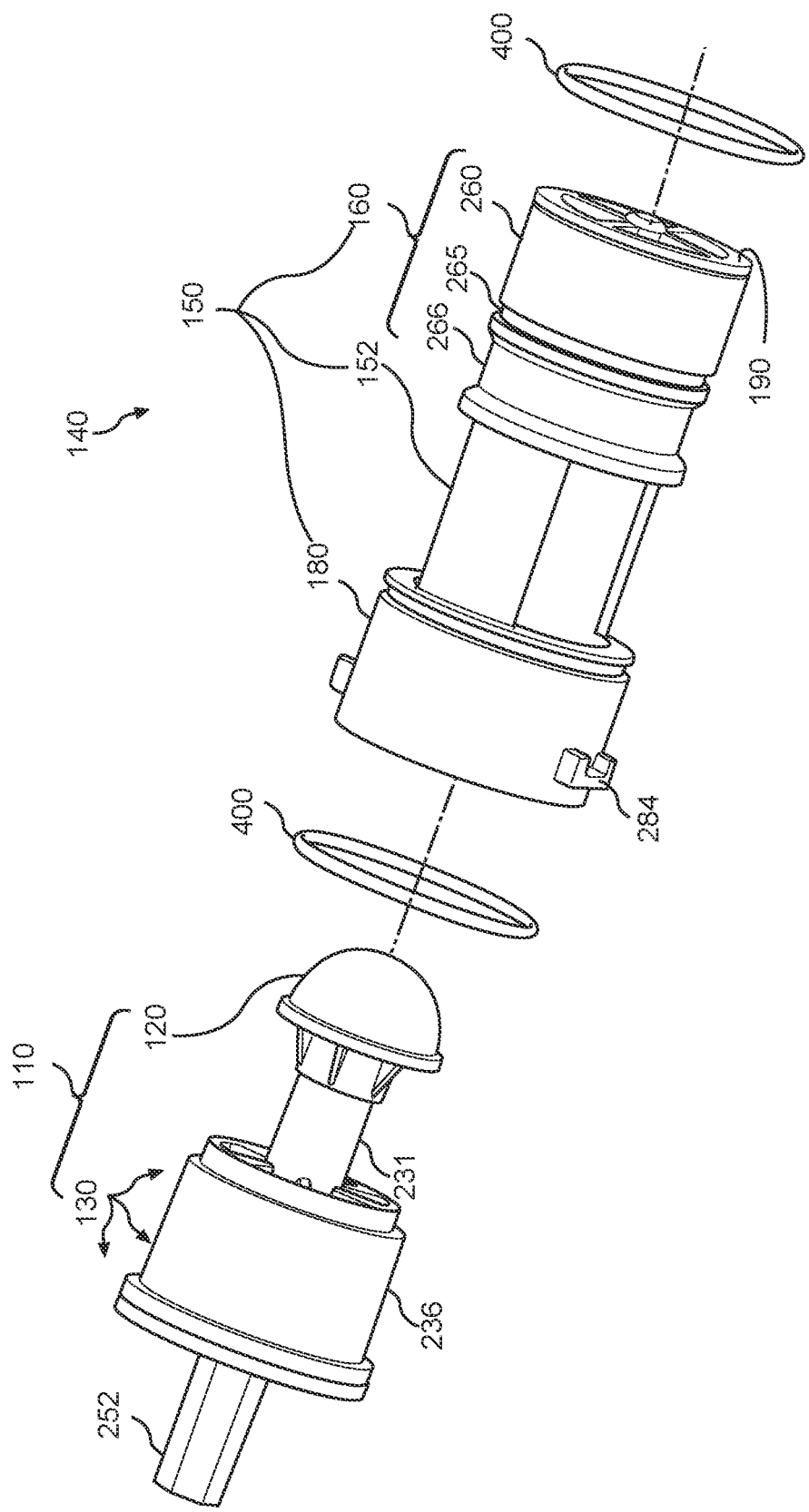
FIG. 4 illustrates assembled first and second sub-assemblies as part of exploded view of a valve assembly, according to an aspect of the present disclosure.

FIG. 4 illustrates first and second sub-assemblies 110, 140 as part of an exploded view of the valve assembly 100, according to an aspect of the present disclosure. FIG. 4 is provided to illustrate a particular utility and serviceability of exemplary valve assemblies described herein. As discussed with reference to FIGS. 2A and 2B, the actuator 240 and valve controller 241 may be provide within the base 236 of the second housing 230 sealed from the open chamber 105 by the shaft seal 244. Thus, the actuator 240 and other electrical components such as the valve controller 241 and the position sensor 258 and sealed from a flow of fluid regulated by the valve assembly 100.

In some examples, the first sub-assembly 110 may be permanently attached to the second sub-assembly 140. In other examples the first sub-assembly 110 may be able to be removed, in total, from the second sub-assembly 140. Accordingly, any issues with the valve assembly 100 specific to the actuator 240, the shaft 242, position sensor 258, or valve member 120 can be addressed without completely disassembling the valve assembly 100. Likewise, should the second sub-assembly 140 present an issue (e.g., inadequate bearing lubrication, failing magnet or other flow sensing component, damage to the wall segments 152, the first mating structure 160, and/or the second mating structure 180) that make up the first housing 150), it can be readily addressed without disturbing the first sub-assembly 110 beyond disassembly from the second sub-assembly 140.

FIG. 4 also illustrates how a simple and compact design of the valve assembly 100 allows for quick, easy, and adequately secure leak avoiding installations. The cylindrical construction of the exemplary valve body 150 enables the use of O-rings 400 to maintain seals between the valve assembly 100 and housings, ports, retention plates, and the like, in which the valve assembly 100 is installed. In addition, finding the correct structure in a housing or retention plate simply requires finding cylindrical bores or holes that define slots or outlet ports having a diameter corresponding to a diameter of the first end 260 of the first mating structure 160, and/or a diameter of the second mating structure 180.

In one example, a diameter of the first end 160 may be less than a diameter of the second mating structure 180. In such a configuration, the valve assembly 100 can be installed into a housing having outlet ports corresponding to slots in a retention plate, by inserting the valve assembly 100 into the housing through a slot with first end 160 being a lead end or the insertion. In this example, the first end 260 may pass through the slot which corresponds to the shape and size of the second mating structure 180, and be tightly fitted into an outlet aligned with the slot that first end 160 just passed through. With this and other examples, it should be apparent that the valve assembly 100, as a single unit, can be installed or removed from a fluid distribution system easily and in isolation relative to other components (e.g., other valves, pumps, or fluid handling devices).

Still further, valve assemblies described herein, such as the valve assembly 100 illustrated in FIG. 4, combine a flow regulating component (first sub-assembly) with a flow monitoring component (second sub-assembly) in a single unit. Thus, a valve assembly of the present disclosure can be utilized as a single device that provides precise control of a valve member for which a flow regulating performance is measured immediately downstream of an opening regulated by that valve member. The compact design of the valve assemblies described herein can save on space that would otherwise be taken up by valves piped into fluid channels separately from flow sensors. While saving on space, the valve assemblies can reduce the amount of communications cable and wiring relative to what may be required by other systems. In particular, a single conduit could carry power, control, and data transmission lines that power the valve assembly, control actuator or inform valve controller operations, and transmit and receive information that can be converted into measured flow rate readings.

Figure 5:
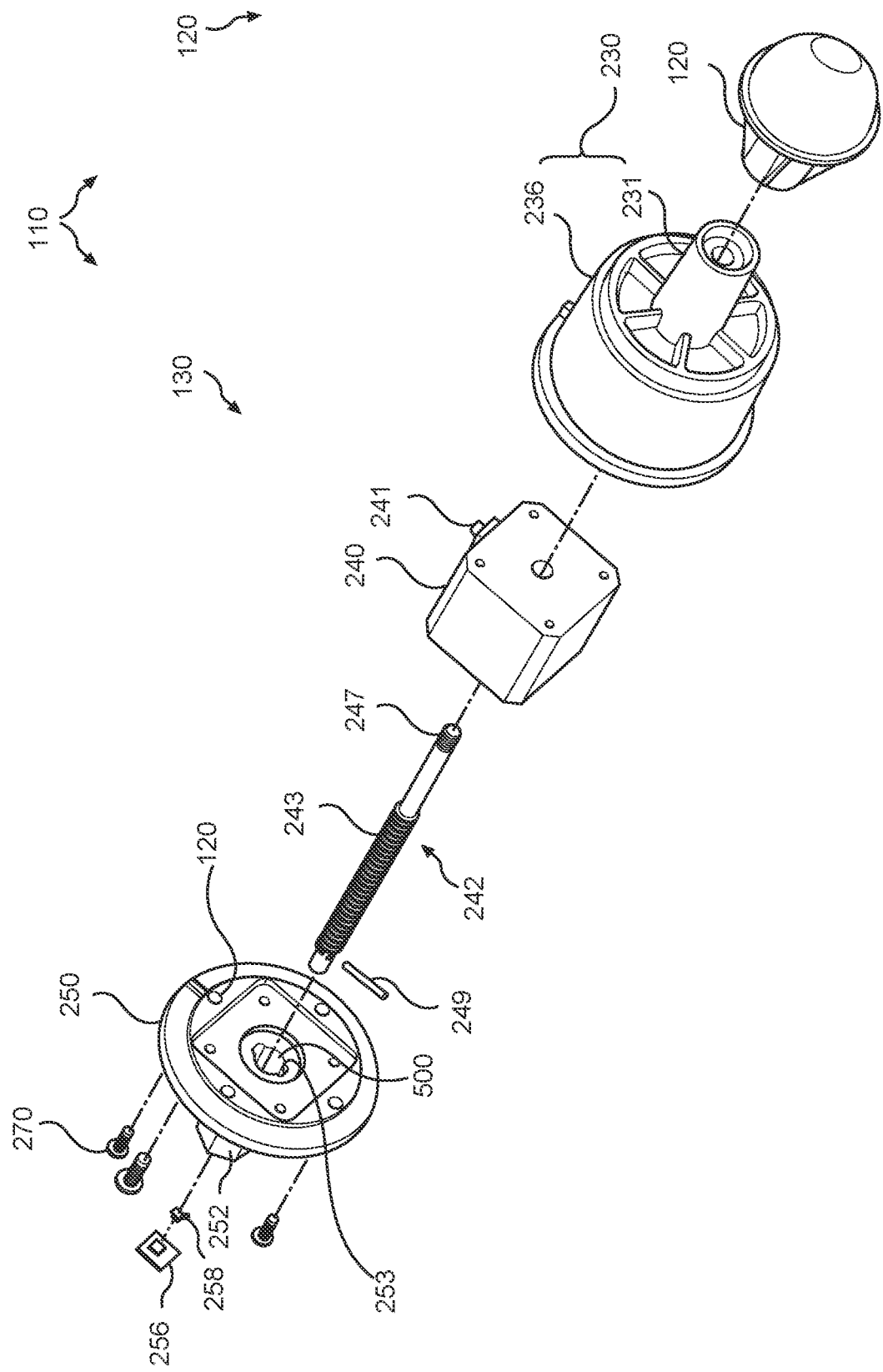
FIG. 5 illustrates an exploded view of a first sub-assembly including an actuator and a valve member.

FIG. 5 illustrates an exploded view of the first sub-assembly 110 including the actuator assembly 130 and the valve member 120. FIG. 5 illustrates a simple construction of the actuator assembly 130, as well as a replaceability of either the actuator assembly 130 or the valve member 120. As described above, the shaft 242 of the actuator assembly 130 is caused to move up and down by the actuator 240. Rather than include bulking housing having a constant diameter, the valve cover 250 accommodates movement of shaft 242 with the head 252—sized just large enough to define a movement chamber 500 inward of the tracks 253 sufficient in diameter to receive the first threaded section 243. In addition, placement of the position sensor 258 at the top of the head may allow for access and replacement of just this component without having to disassemble any other portion of the first sub-assembly 110 or even the valve assembly 100.

It may be the case the valve assembly 100 operates without issue except that when in a fully close state, some fluid is allowed into the second end 266 of the first mating structure 160. Irregularities in a surface of the valve member 120 may cause this issue. The valve member 120 can easily be detached from the second threaded section 247 at the distal end 246 of the shaft 242 and replaced.

Figure 6:
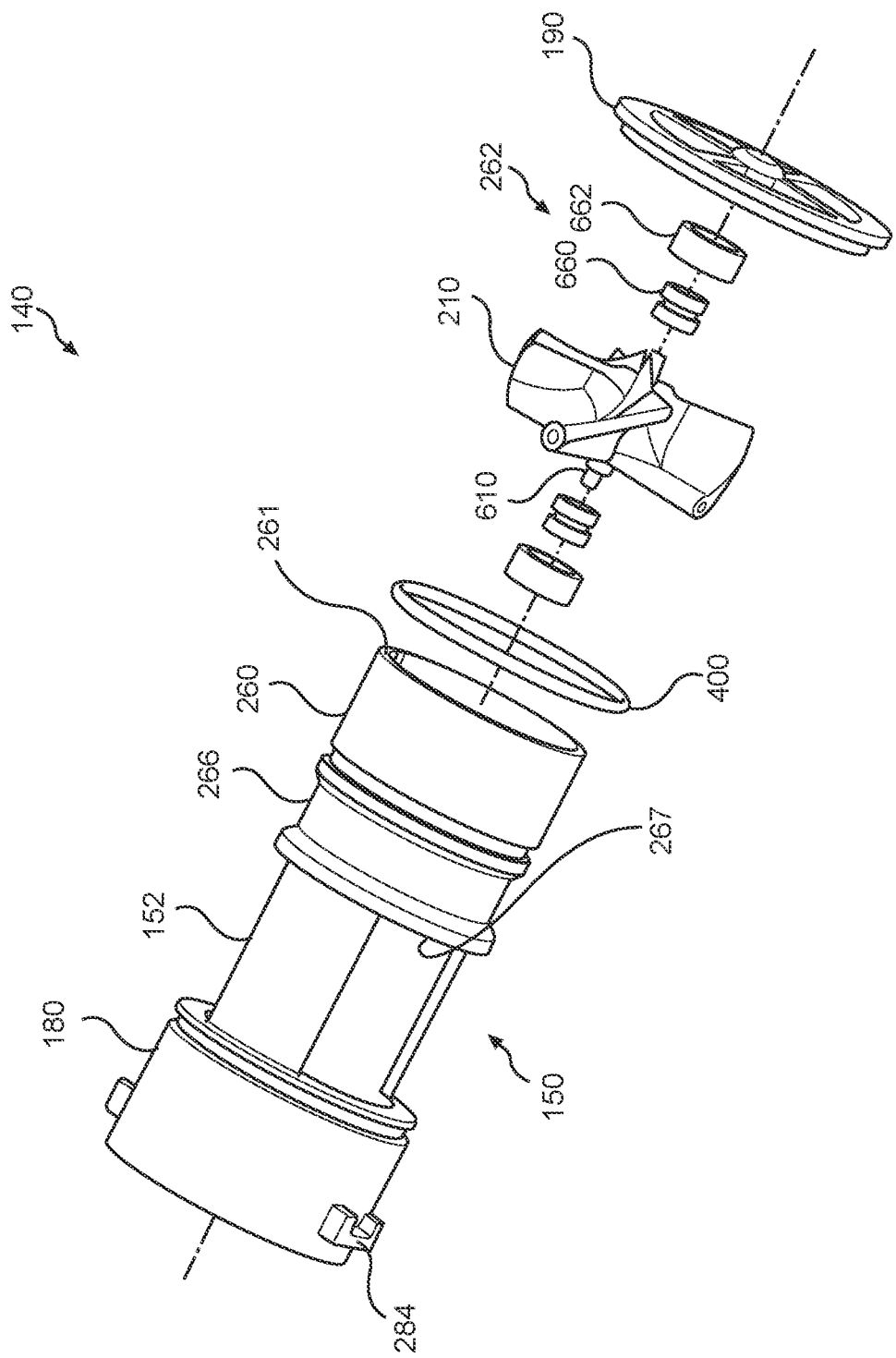
FIG. 6 illustrates an exploded view of a second sub-assembly including a first housing and a flow sensor.

FIG. 6 illustrates an exploded view of the second sub-assembly 140 including the first housing 150 and the impeller/flow sensor 210. The impeller 210 may be mounted or otherwise engaged to the partition hub 264 and the end hub 190 with the bearings 262. In one example, each of the bearings 262 may include a ball bearing having a race 660 and a journal 662. Each bearing 262 may have its race 660 mounted onto a respective end of an impeller shaft 610, and surrounded by a respective journal 662 fitted into the end hub 190 of the partition hub 264.

The second sub-assembly 140 can easily be paired with first sub-assemblies 110 of different types (e.g., first sub-assemblies 110 have differently shaped valve members, shaft lengths, position sensors). In one example previously mentioned, flow monitoring component for paring with the magnets 220 may be embedded within a wall of the first end 260 of the first mating structure 160. A terminal or other type of electrical connection, or a signal transmitting device that implements a particular (wireless) communication protocol (e.g., Bluetooth, Wifi, Zigbee, NFC, etc.), may also be embedded in the first end 260 and connected to the flow monitoring component paired with the magnets 220, in one example. Thus, the second sub-assembly 140 can be matched with different types of actuator assemblies 130 and valve members 120 as required for a level and type of flow control desired with a fluid distribution system, such as a pool operating and control system, in one example.

Figure 7A:
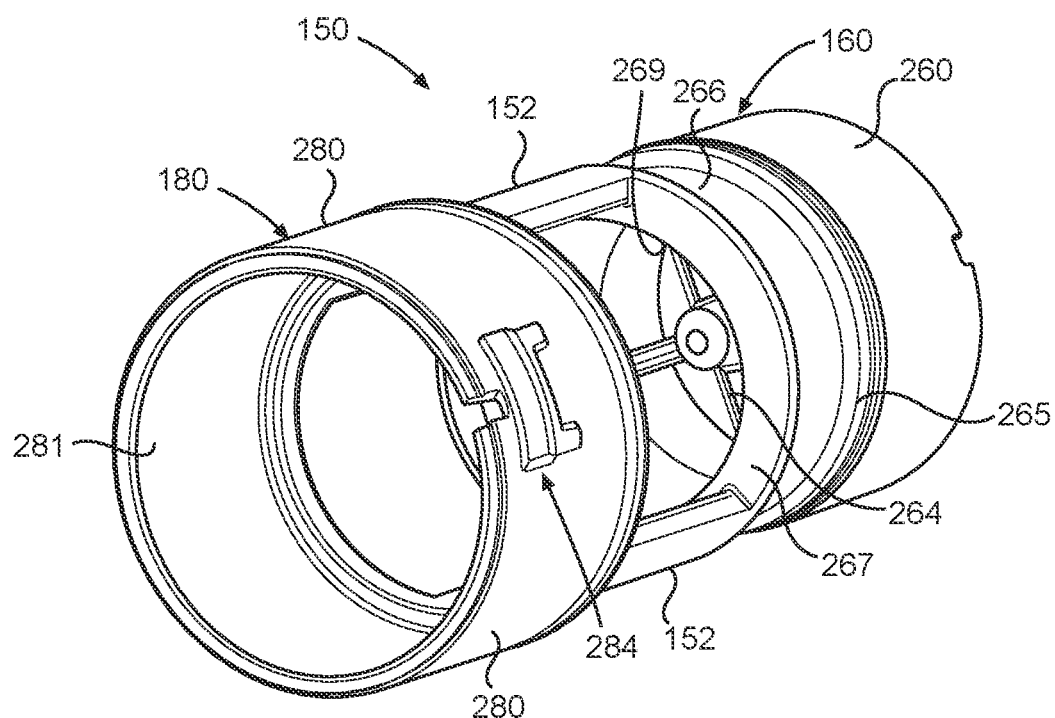
FIGS. 7A and 7B illustrate perspective views of a first housing.
Figure 7B:
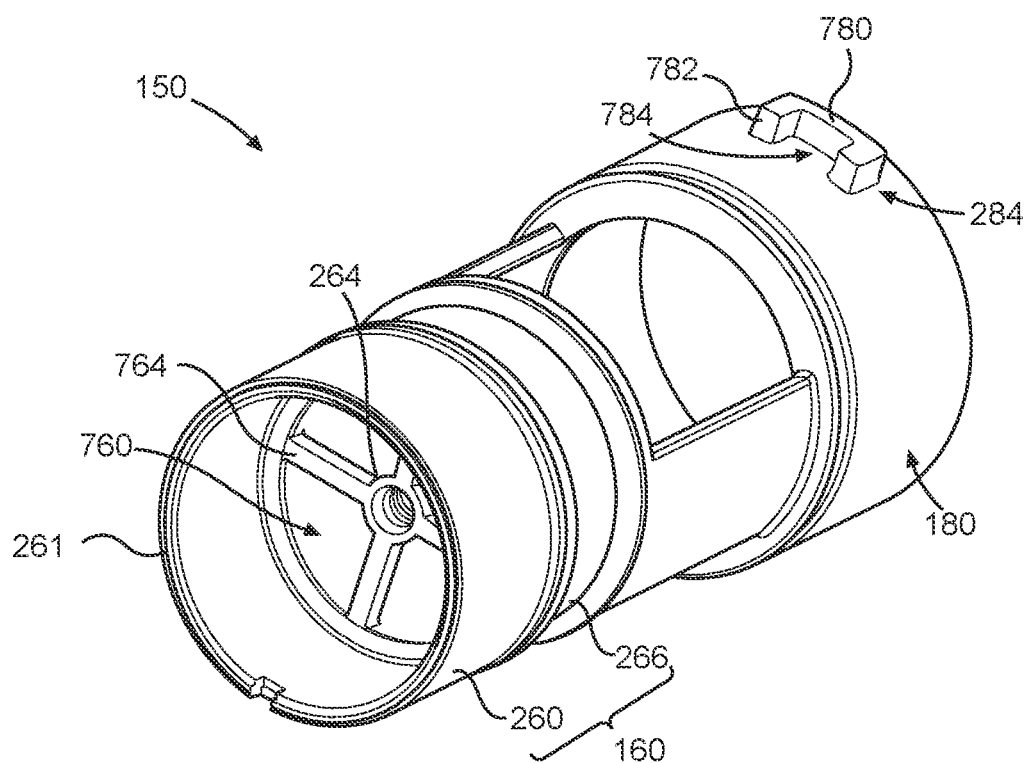
Figure 8B:
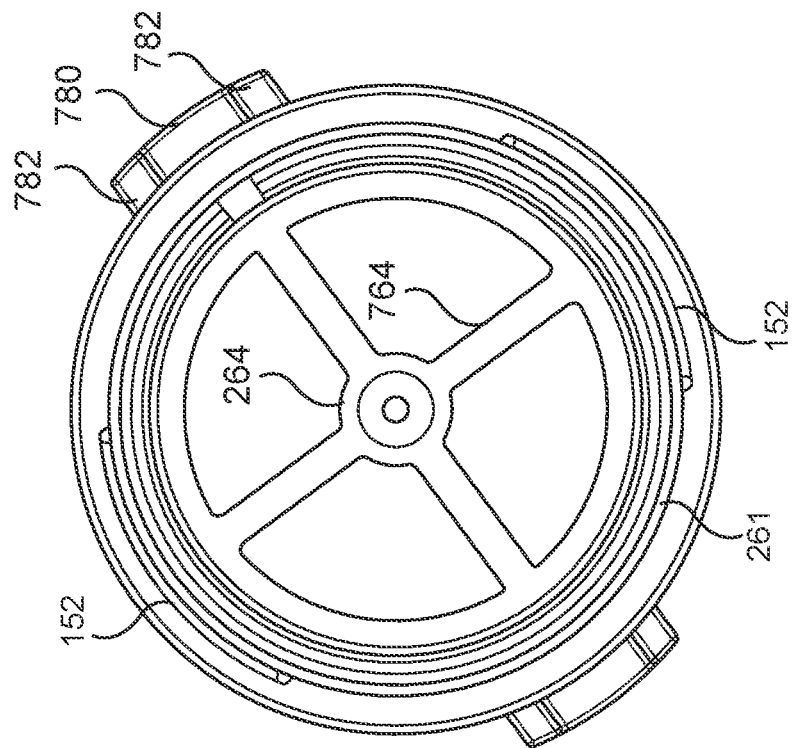
FIGS. 8A and 8B illustrate overhead and bottom views of the first housing of FIGS. 7A and 7B.
Figure 8A:
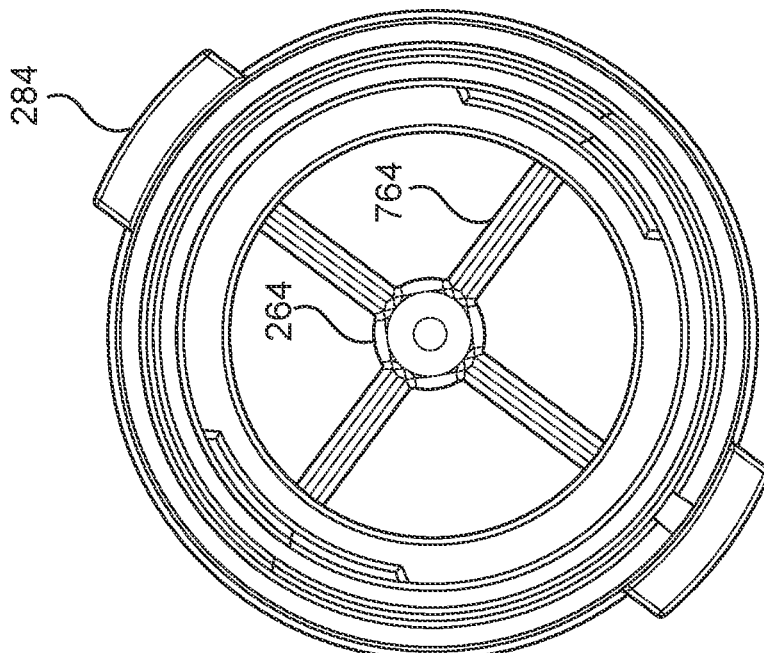

Aspects of an exemplary first housing will now be discussed with reference to the first housing 150 previously mentioned, and FIGS. 7A, 7B, 8A, and 8B. FIGS. 7A and 7B illustrate perspective views of the first housing 150, whereas FIGS. 8A and 8B illustrate overhead and bottom views of the first housing 150.

As previously discussed, the first housing 150 may include the first mating structure 160 extending from two or more wall segments 152, which extend from the second mating structure 180. The first mating structure 160 includes the first end 260 that may be sized to fit within an outlet formed in a housing that is part of, for example, a manifold. In one example, the valve assembly 100 may be one of several valve assemblies 100 installed in several outlets of a housing for a manifold. The first end 260 may define the first end face 261, that may be configured to engage an end hub 190 (not shown) that secures an impeller 210 (not shown) within the first end 260, or an end cap (not shown).

The second end 266 of the first mating structure 160 may be separated from the first end 260 by the partition hub 264. The partition hub 264 is attached to an inner surface of the first mating structure 160 by arms 764. Between the arms 764 are defined through ports 760 that remain in communication with the fluid output chamber 218 and the space defined by the first end 260 in which the impeller 210 is installed. An outer circumference of the first mating structure 160 may be formed with a recessed groove 265 to receive the O-ring 400. Above the partition hub 264 and the recessed groove 265, the second end 266 of the first mating structure 160 defines the fluid output chamber 218 that may receive a portion of the valve member 120. The second end 266 of the first mating structure 160 defines the second end face 267 which provides a valve seat for engaging the valve member 120 (e.g., a plunger) of the valve assembly 100 and closing an opening to the fluid output chamber 218.

Turning to the second mating structure 180, an inner surface 281 thereof may be specifically configured to receive and secure the second housing 230 of an actuator sub-assembly of a valve assembly 100. An outer surface 280 on the other hand, may be provided with engagement members 284 as shown, to facilitate an interlocking engagement with the slot 1400.

In one example, the engagement members 284 may include a horizontal body 780, and legs 782 extending from opposite ends of the horizontal body 780 towards the first end 260 of the first housing 150. An outer perimeter of the engagement member 284 therefore defines a rectangular shape that may correspond to a recess provided in a valve retention plate, for example, that is configured to receive the valve assembly 100. Together with the horizontal body 780, the legs 782 can define a height of the engagement member 284 substantially corresponding to height of a track of a slot. Thus, the second mating structure 180 of the first housing 150 is configured to slide in and be locked to a slot. In another example, a recess 784 defined between the legs 782 can engage a stationary or spring-loaded protrusion provided in a slot of some type.

The first housing 150 can tightly fit into a proximal end of an outlet port, be interlocked into a position through an engagement with a slot of a retention plate, and securely, but removably, retain an actuator of a valve assembly 100. As a result of the combined flexibility provided by how the first housing is configured to be able to engage multiple types of components, a substantial number of said components can be serviced or replaced in isolation. In addition, servicing or replacement may be accomplished with little or no down time of a system incorporating the valve assembly being serviced. In addition, additional sensors, such as temperature, salinity, chlorine, and other types of sensors can be added to a valve assembly according to the present disclosure.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A valve assembly comprising:
    a first housing and a second housing, the first housing defines an inlet and a fluid output chamber and includes:
        a first mating structure having a first end and a second end,
        a second mating structure that receives the second housing, and
        wall segments that are annularly spaced apart and extend between the second mating structure and the second end of the first mating structure;
    a cover engaged to the second housing;
    a valve member positioned in the first housing;
    an actuator positioned between the second housing and the cover, the actuator attached to the valve member through an engagement located within the first housing; and
    a flow rate sensor positioned downstream of the inlet,
    wherein the wall segments define an open chamber between the first mating structure and the second mating structure upstream of the inlet, the open chamber being in fluid communication with an area surrounding the wall segments between the first mating structure and second mating structure, and
    wherein the actuator is configured to move the valve member to selectively put the inlet in fluid communication with the area surrounding the wall segments through the open chamber.

2. The valve assembly of claim 1, wherein the flow rate sensor includes a flow monitoring component configured to move with fluid flowing from the fluid output chamber.

3. The valve assembly of claim 2, wherein the flow monitoring component includes an impeller, and wherein the flow monitoring component includes magnets disposed within the impeller.

4. The valve assembly of claim 1,
    wherein the second end defines a valve seat for the valve member.

5. The valve assembly of claim 1, further comprising a partition hub disposed within the first mating structure between the first end and the second end, and wherein the flow rate sensor is mounted to the partition hub.

6. The valve assembly of claim 1, further comprising an end hub attached to the first end, wherein the end hub defines a plurality of outlet ports, and wherein the end hub is configured to secure the flow rate sensor within the first mating structure.

7. A valve assembly comprising:
    a first housing and a second housing, the first housing defines an inlet and a fluid output chamber and includes:
        a first mating structure having a first end and a second end,
        a second mating structure that receives the second housing, and
        wall segments that are annularly spaced apart and extend between the second mating structure and the second end of the first mating structure;
    a cover engaged to the second housing;
    a valve member positioned in the first housing;
    a prime mover extending within the first housing and attached to the valve member;
    an actuator positioned between the second housing and the cover, the actuator engaged with the prime mover and configured to cause a linear movement of the valve member towards and away from the inlet;
    a flow rate sensor positioned downstream of the fluid output chamber, the flow rate sensor including a flow monitoring component configured to perform an operation indicative of a flow rate of fluid flowing from the fluid output chamber,
    wherein the wall segments define an open chamber between the first mating structure and the second mating structure upstream of the inlet, the open chamber being in fluid communication with an area surrounding the wall segments between the first mating structure and second mating structure, and
    wherein the actuator is configured to cause the valve member to selectively put the inlet in fluid communication with the area surrounding the wall segments through the open chamber.

8. The valve assembly of claim 7, wherein the second housing includes a base and a stem portion, and wherein the prime mover extends through the stem portion surrounded by the open chamber and is attached to the valve member within the first housing.

9. The valve assembly of claim 8, wherein the prime mover includes a threaded shaft that engages a thread component of the actuator within the base of the second housing.

10. The valve assembly of claim 9, wherein a movement path of the shaft extends from a movement chamber defined by an inner surface of the cover, through the second housing, to the open chamber defined by the first housing.

11. The valve assembly of claim 10, wherein the inner surface of the cover defines tracks on opposites sides of the movement chamber, and wherein the shaft includes a pin that is received in the tracks and configured to guide a linear movement of the shaft in opposing directions.

12. The valve assembly of claim 7, further comprising a valve controller, wherein the valve controller is configured to receive an instruction and operate the valve assembly in an open or closing operation based on a current flow rate derived from the operation of the flow sensor.

13. The valve assembly of claim 12, wherein the actuator includes a stepper motor and the valve controller is configured to operate the stepper motor in increments, and wherein the increments are at least one of time-based and based on a measure of displacement of the prime mover.

14. A method of regulating a flow of fluid with a valve assembly including a first housing and a second housing, the method comprising:
    operating an actuator to displace a valve member relative to an inlet defined by the first housing, the first housing including:
        a first mating structure having a first end and a second end,
        a second mating structure that receives the second housing, and
        wall segments that are annularly spaced apart and extend between the second mating structure and the second end of the first mating structure;
    registering an operation of a flow monitoring component caused by a flow of fluid flowing from the inlet and out of the first end of the first mating structure;
    determining a flow rate of the fluid based on the operation of the flow monitoring component; and
    operating the actuator to move the valve member relative to the inlet with the actuator based on the flow rate;
    wherein the flow monitoring component operates within a first area within the first housing that is downstream of a fluid output chamber, the fluid output chamber being defined by the first mating structure downstream of the inlet and upstream of the first end of the first mating structure, wherein the wall segments define an open chamber between the first mating structure and the second mating structure upstream of the inlet, the open chamber being in fluid communication with a second area that surrounds the wall segments, and wherein operating the actuator causes the valve member to affect a fluid communication through the open chamber between the inlet and the area surrounding the wall segments.

15. The method of claim 14, wherein registering the operation of the flow monitoring component includes registering a movement of the flow monitoring component being caused to move by the flow of fluid, wherein the flow monitoring component moves within the first area within the first housing and wherein the first area is immediately adjacent to the fluid output chamber.

16. The method of claim 15, wherein the flow monitoring component includes an impeller, and wherein the flow monitoring component includes magnets disposed within a base of the impeller.

17. The method of claim 14, wherein the actuator includes a stepper motor, wherein operating the actuator includes operating the stepper motor in increments, and wherein the increments are at least one of time-based and based on a measure of displacement of the prime mover.

18. The method of claim 14, wherein the prime mover includes a threaded shaft engaged to a threaded section of the actuator.

19. The method of claim 14, wherein the actuator is disposed in the second housing of the valve assembly engaged to the first housing, and wherein a movement path of the prime mover extends from a movement chamber defined by an inner surface of a cover attached to the second housing, through the second housing, to the open chamber.

* * * * *

UNITED STATES PATENT AND TRADEMARK OFFICE
CERTIFICATE OF CORRECTION

| | | |
|---|---|---|
| PATENT NO. | : 11,204,106 B1 | Page 1 of 1 |
| APPLICATION NO. | : 17/185926 | |
| DATED | : December 21, 2021 | |
| INVENTOR(S) | : Doyle et al. | |

It is certified that error appears in the above-identified patent and that said Letters Patent is hereby corrected as shown below:

On the Title Page

At (73), the name and address of the Assignee should be changed, from:
"Valve Technologies, LLC, Pompano Beach, FL (US)"

To:
--Hayward Industries, Inc., Berkeley Heights, NJ (US)--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*